United States Patent [19]

Ruegg

[11] 3,817,679
[45] June 18, 1974

[54] INJECTION MOLDING MACHINE INCLUDING A FIXED PLATEN SUPPORTING NOZZLE ASSEMBLY MOUNTING FLANGES

[75] Inventor: Edwin Ruegg, Netstal, Switzerland

[73] Assignee: Maschinenfabrik und Giesserei Netstal AG, Nafels, Switzerland

[22] Filed: Apr. 4, 1972

[21] Appl. No.: 240,978

[30] Foreign Application Priority Data
Apr. 15, 1971  Switzerland.......................... 5445/71

[52] U.S. Cl.............. 425/450 R, 425/192, 425/248
[51] Int. Cl............................................... B29f 1/06
[58] Field of Search........... 425/450, 144, 188, 120, 425/130, 242, 247, 248, 190, 192

[56] References Cited
UNITED STATES PATENTS

| | | | |
|---|---|---|---|
| 2,296,730 | 9/1942 | Muller et al. | 425/248 |
| 3,068,520 | 12/1962 | Hehl | 425/247 X |
| 3,086,244 | 4/1963 | Hehl | 425/130 X |
| 3,373,459 | 3/1968 | Hehl | 425/248 |
| 3,564,658 | 2/1971 | Hehl | 425/188 |
| 3,596,325 | 8/1971 | Hehl | 425/242 X |

Primary Examiner—J. Spencer Overholser
Assistant Examiner—David B. Smith
Attorney, Agent, or Firm—McGlew and Tuttle

[57] ABSTRACT

An injection molding machine comprises a mold clamping unit which includes a fixed platen and a movable platen which is guided on the fixed platen on guide rods which are mounted in the fixed platen. The fixed platen is generally rectangular and it has at least four relatively narrow end faces on at least three of which there is mounted an injection molding unit. Each mounting part for the injection molding unit includes transversely spaced flanges which extend over the front face of the fixed platen and each includes an injection molding nozzle guide. The guide supports each individual injection nozzle between the flanges of each mounting part. The mounting parts are identical and are accurately positioned on the respective narrow side face of the platen by means of adjusting wedges and adjustable slotted bolt connections.

9 Claims, 10 Drawing Figures

INJECTION MOLDING MACHINE INCLUDING A FIXED PLATEN SUPPORTING NOZZLE ASSEMBLY MOUNTING FLANGES

BACKGROUND OF THE INVENTION

This invention relates in general to the construction of injection molding devices, and in particular, to a new and useful injection molding machine having a mold clamping unit with a fixed platen having side faces which provide mountings for individual injection molding units.

DESCRIPTION OF THE PRIOR ART

At the present time, injection molding machines are known wherein the injection units including the injection nozzle are mounted to mounting members which in turn are fixed on the guide pins of the mold clamping unit which provides a guiding to the stationary platen. This type of construction requires not only a multitude of individual mounting parts and correspondingly much complicated assembly work but also it takes up a great deal of space. The pressure applied by the nozzle is transferred to the stationary platen by parts which are secured on the guide rods so that unavoidable deformation of the guide rods results and this causes a premature wear of the mold guiding parts. In addition, the fact that the mounting parts are attached to the guide rods reduces the clearance between the guide rods because the outside diameter of the mounting parts is larger than the guide rod diameters. In addition, a distance between the center of the nozzle and the mounting surface of the stationary platen cannot be accurately adjusted without additional auxiliary means.

SUMMARY OF THE INVENTION

In accordance with the invention, there is provided an injection molding machine in which the disadvantages of the prior art are overcome by a mounting arrangement of the individual mounting parts for each injection molding nozzle which are adjustable in respect to the stationary platen axis and which may be attachably affixed to any one of each of at least three narrow sides of the stationary platen which is of generally rectangular flat construction.

In accordance with the invention, a mounting part which is adapted to engage any one of the three edge faces of the fixed platen is provided with two flanges which project over one side of the platen and provide guide bearings for guide rods of an injection molding unit. The injection molding unit is mounted for sliding movement on guide rods so that the nozzle extends between the guide flanges of the mounting unit on the side of the fixed platen which is adjacent the movable platen.

With the arrangement of the invention, it is possible not only to place one injection molding unit so as to inject into the mold parting plane which is parallel to the plane of the platens on each of the four narrow sides of the stationary platen but it is also possible to make the mold clamping unit of a compact construction. Even an additional fifth injection unit can be mounted with its guide pins on the other side of the stationary platen from the movable platen provided the fixed platen is provided with an opening for the nozzle of the injection unit so mounted in order to permit the injection unit to permit the injection of the material into the mold perpendicularly to the mold parting plane. A further advantage of the construction is that identical mounting parts may be fabricated for mounting on each of the three ends or edges of the fixed mold platen and each may carry its own injection molding unit. The construction permits quick and accurate adjustment of the respective nozzle in respect to the desired plane of injection.

Accordingly, it is an object of the invention to provide an improved injection molding machine which includes a mold clamping unit comprising a fixed platen and a movable platen which is movable relative to the fixed platen and which includes an injection nozzle assembly mounting unit in the form of a member which may be secured to any free edge face of the fixed platen and which includes guide portions for the guidable mounting of the injection nozzle between the fixed and movable platen.

A further object of the invention is to provide an injection molding device which comprises a mold clamping unit including a fixed platen and a movable platen, the fixed platen including side, top and bottom edges of generally rectangular configuration which provide mounting bases, with one or more of them being provided with a mounting unit for an injection nozzle assembly to provide guide means for guiding the injection nozzle assembly in a plane parallel to the parting plane between the fixed and movable platens.

A further object of the invention is to provide an injection molding machine which includes a fixed and a movable platen and with mounting means carried on the edges of the fixed platen for adjustably mounting a plurality of injection nozzles for movement in the plane parallel to the parting plane between the fixed and movable platens and preferably mounting means for an additional injection nozzle assembly for movement in a plane perpendicular to the parting plane for injection through at least one of the platens.

A further object of the invention is to provide an injection molding machine which is simple in design, rugged in construction and economical to manufacture.

The various features of novelty which characterize the invention are pointed out with particularity in the claims annexed to and forming a part of this disclosure. For a better understanding of the invention, its operating advantages, and specific objects attained by its uses, reference should be had to the accompanying drawing and descriptive matter in which there are illustrated preferred embodiments of the invention.

GENERAL DESCRIPTION OF THE PREFERRED EMBODIMENT

Figure 1:
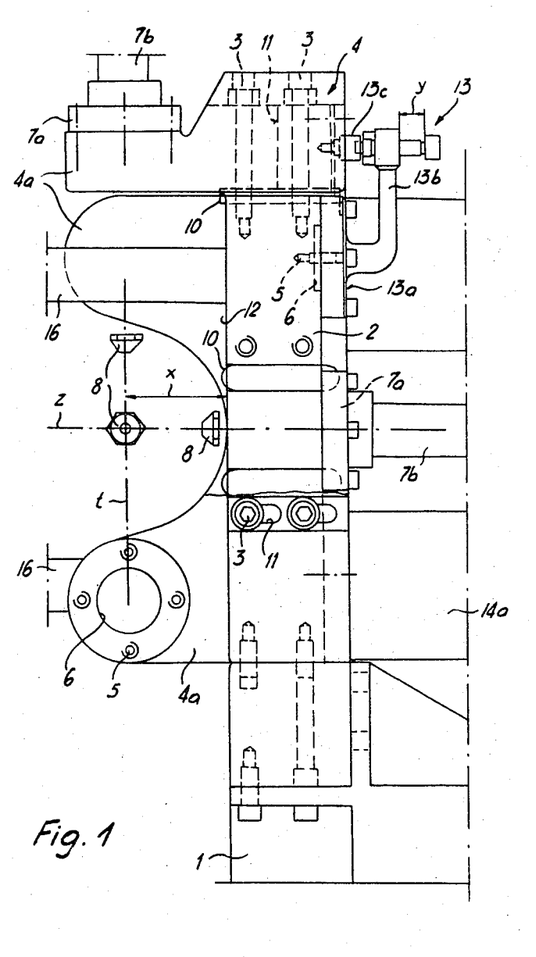
FIG. 1 is a partial side elevational view of an injection molding machine stationary platen constructed in accordance with the invention.
Figure 2:
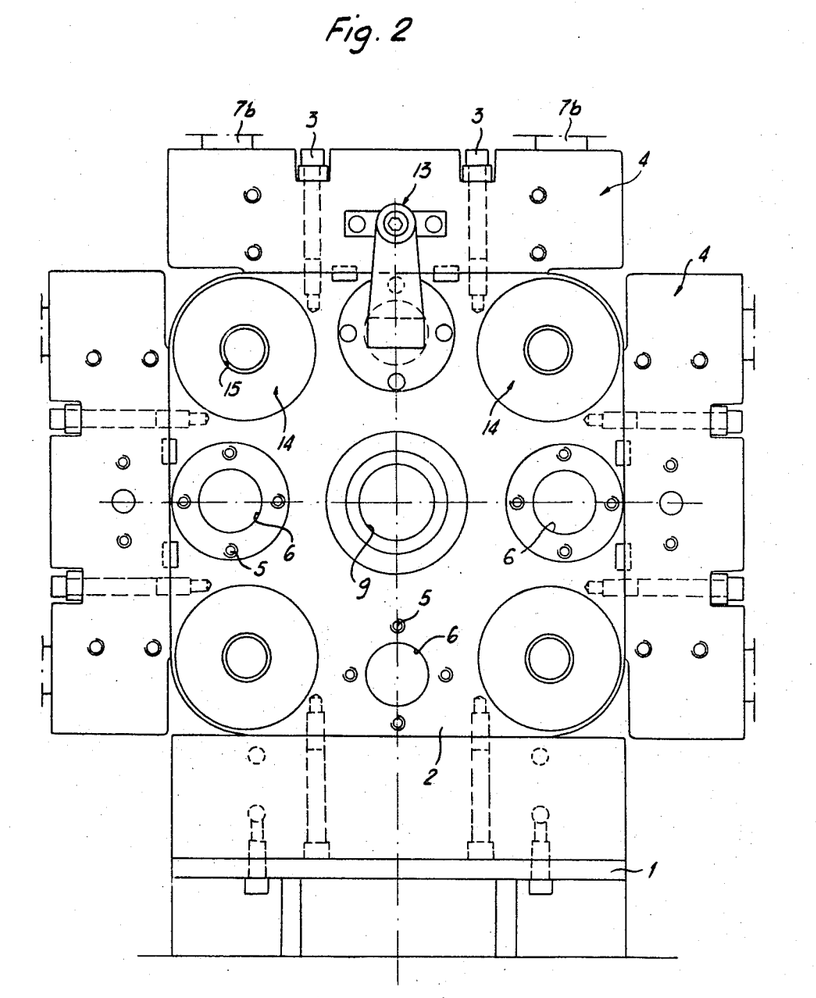
FIG. 2 is a right side elevational view of the platen shown in FIG. 1.
Figure 3:
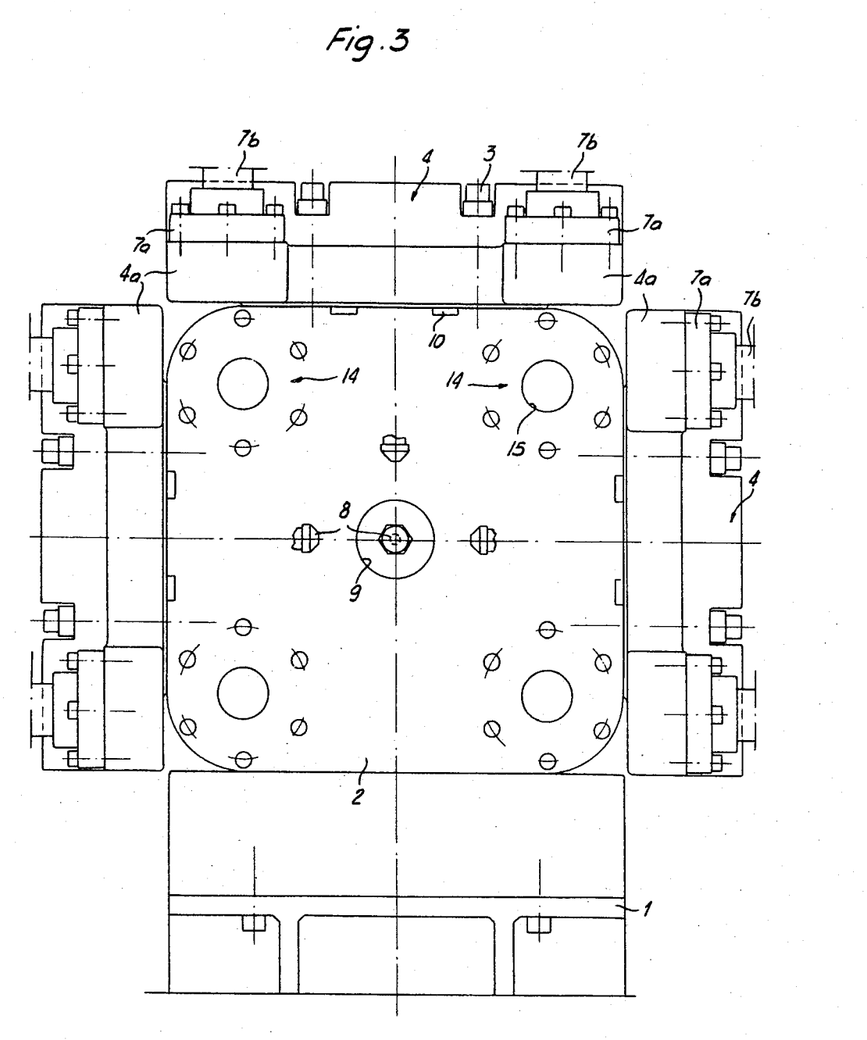
FIG. 3 is a left side elevational side view of the platen shown in FIG. 1.

Referring to the drawings in particular, the invention as shown in FIGS. 1 through 3, comprises an injection molding machine which includes a stationary plate 2 of generally rectangular configuration and being of relatively wide with and long height and short depth so as to define narrow side faces of generally rectangular flat construction which provide mounting bases for individual injection nozzle assemblies which are schematically indicated at 8 and also provide means for securing the platen on a base or frame 1.

In accordance with the invention, the stationary platen itself, defines narrow sides forming mounting bases on which identical mounting parts 4 may be mounted to accommodate individual injection nozzle assemblies 8. In the embodiment shown in FIGS. 1 through 3, a mounting unit 4 is provided on each side base and on the top base and a lower base is secured to the machine frame 1.

Figure 8:
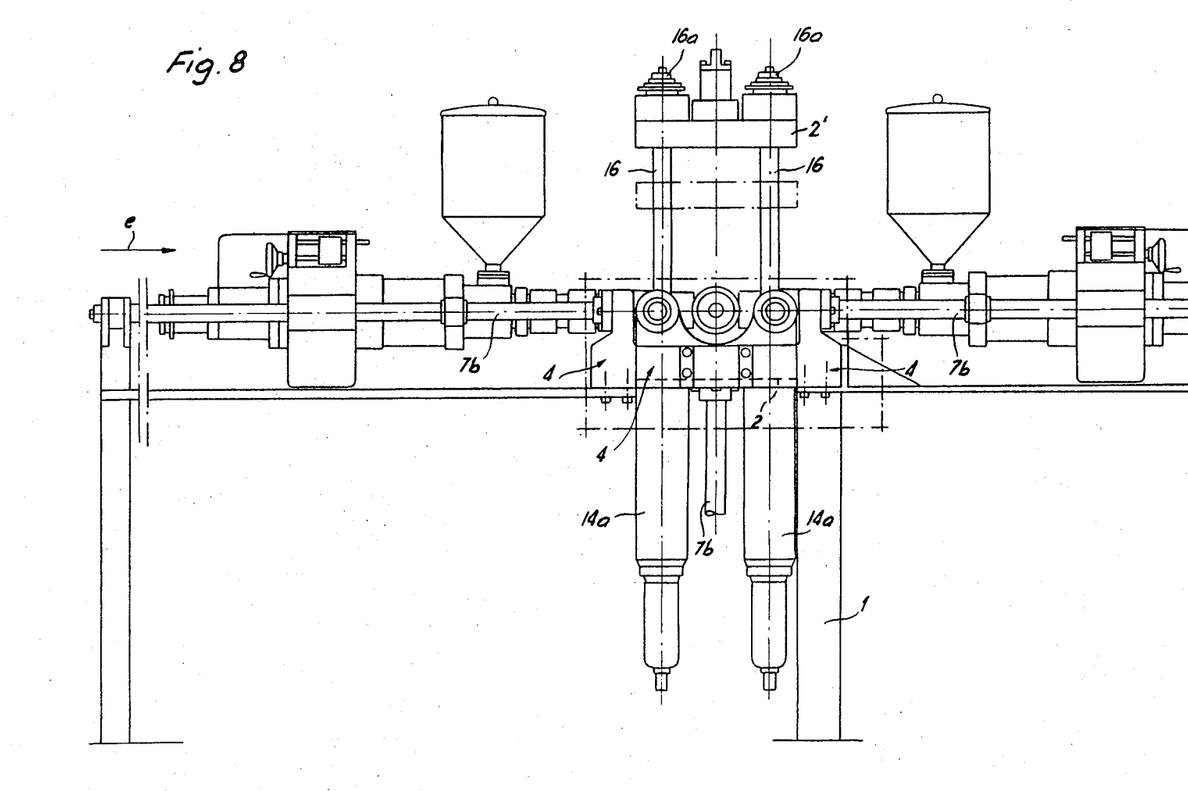
FIG. 8 is a partial side elevational view of an injection molding machine with the fixed platen having the same number of injection assembly mounting elements as shown in FIG. 6 and being shown on a smaller scale.
Figure 9:
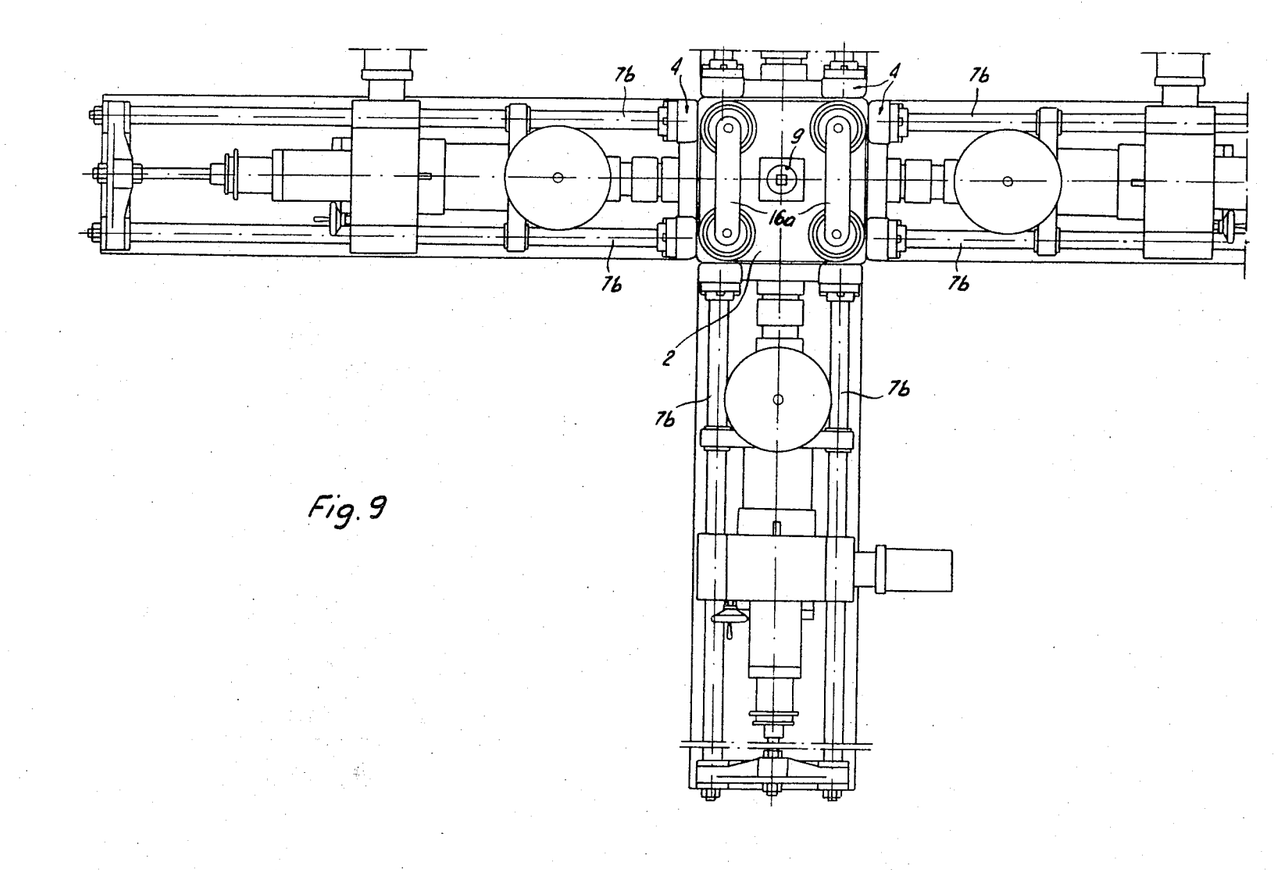
FIG. 9 is a top plan view of the machine shown in FIG. 8.
Figure 10:
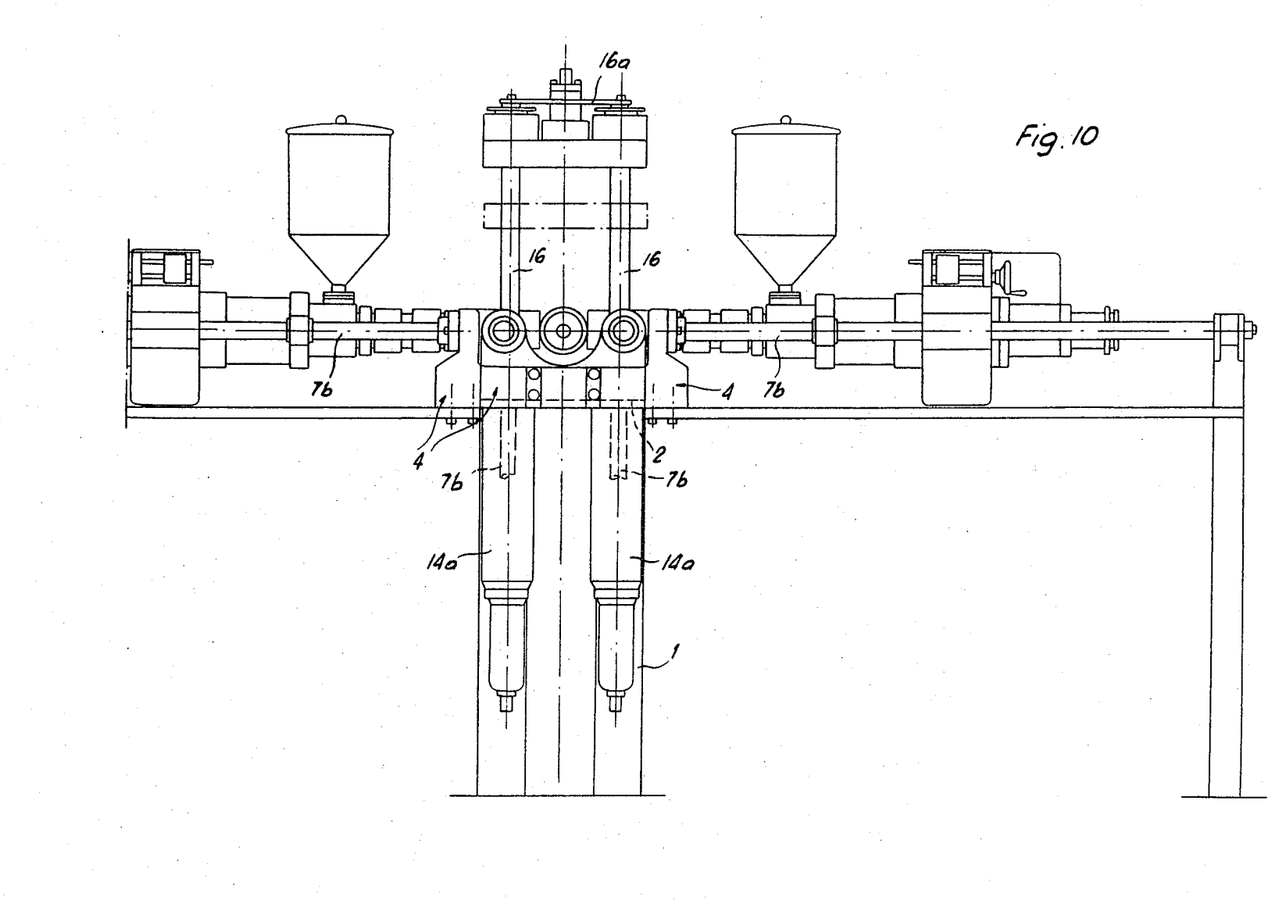
FIG. 10 is an end elevational view of the machine shown in FIG. 8.

Each mounting unit 4 advantageously includes guide means for the injecting nozzle assemblies 8 which overlies the front face of the stationary platen 2, that is, the face, which is adjacent a movable platen 2' which is shown in the whole machine structure shown in FIG. 8. In the construction shown, two flanges 4a project on the mold side or front side of the plate 2 toward the movable platen and each includes a bore 6 for receiving guide rod elements 7b which include terminal flanges 7a which are bolted to bearing rings having circumferentially spaced tap holes. In addition to the three mounting parts 4, which are arranged on the narrow side faces of the platen 2, a fourth injection unit guide may be secured to the platen by mounting the terminal flanges 7a of the guide rods in a horizontal medium plane of the platen 2 on the rear side that faces away from the movable mold part. For this purpose, the platen 2 is provided with the central opening 9 in addition to the receiving bores 6, 6 on each side of the vertical center line in order to provide a central opening for movement of the injection nozzle for injection in a plane perpendicular to the parting plane between the fixed platen and a movable platen.

Each mounting part 4 is advantageously mounted so as to be parallel to a platen axis z shown at FIG. 1. For this purpose, adjustment means in the form of wedges 10 are interposed between the mounting part 4 and the associated narrow side face of the platen 2, and in addition, each mounting part 4 carries laterally or transversely extending adjusting slots 11 for accommodating bolts 3 so that the mounting parts may be adjusted forwardly or rearwardly in respect to the associated platen in the amount indicated by double arrow y in FIG. 1. This provides a spacing x between the nozzle plane 2 of the injection molding unit carried by the mounting parts 4 and the associated die plate surface of the platen 2 which is on the front face for the side directed toward the movable platen. This distance x may be varied by the dimension y indicated in FIG. 1.

The nozzle plane t should coincide with the mold parting plane for the purpose of accurate operation and the adjustability of the mounting parts 4 makes it possible to adjust the respective injection molding units to the plane of the mold parting line when different molds are employed. This accurate adjustment of each mounting part 4 is effected by means of an adjustment device generally designated 13 which includes a support 13b', a terminal flange 13a which corresponds to the terminal flange 7b, and which is dimensioned so that it can be mounted directly on a receiving bore 6 on the platen 2, and a gauging head 13c. The mounting part 4 is adjustably positioned after the bolts 3 are first loosened by first fixing the adjusting devices 13 in position on the platen 2 and subsequently moving the part 4 until it comes to rest against the preset guaging head 13c. With the mounting part 4 thus positioned, it is fixed in position by securing the bolts 3.

In the embodiment of FIGS. 1, 2, and 3, the four corner areas of the platen 2 are provided with mounting areas generally designated 14 for the guide means for the mold clamping unit which includes the movable platen 2' and a cylinder 14a which carries a hydraulic mechanism for the in and out movement of piston rod members 16 associated with each cylinder 14a. The guide rod 16 protrudes through platen bores 15 which carries a movable platen 2' shown in FIG. 8. The guide rods 16 are connected to the platen 2' in a manner so that they form a rigid frame together with the stationary platen 2.

Figure 4:
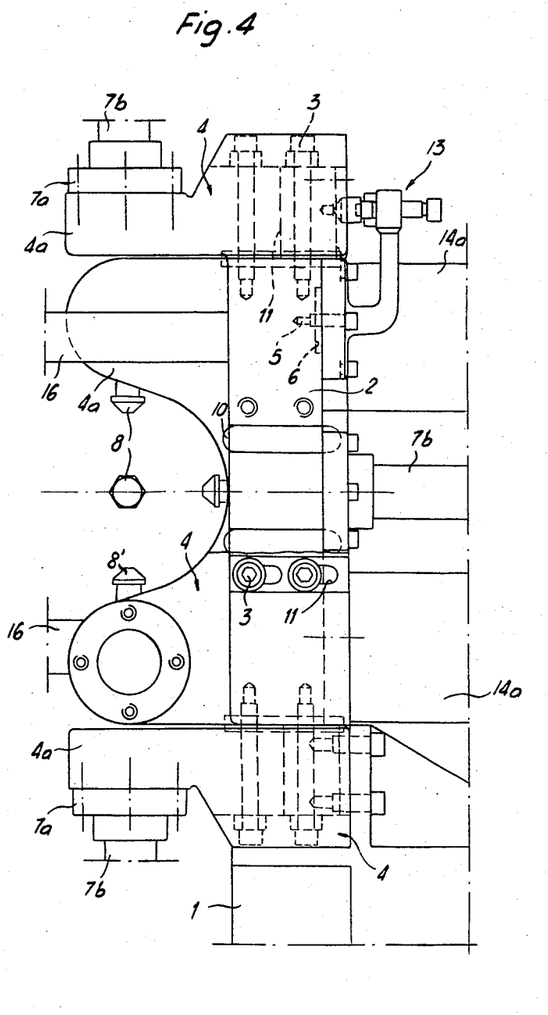
FIG. 4 is a view similar to FIG. 1 showing the platen with an additional injection nozzle assembly mounting.
Figure 5:
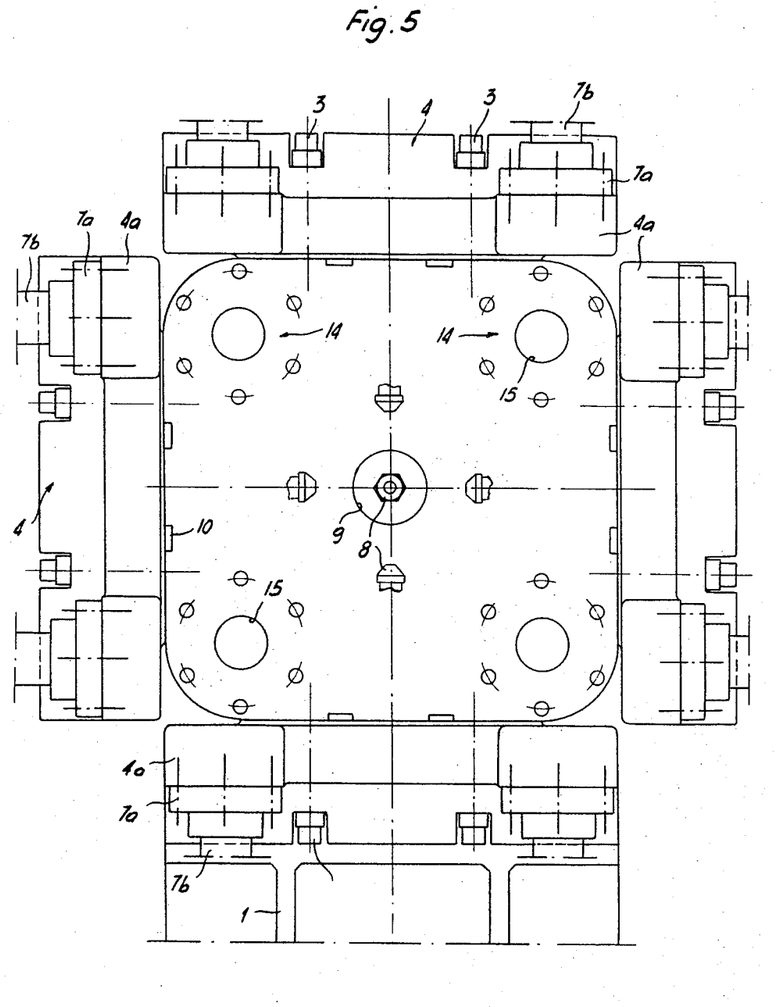
FIG. 5 is a rear elevational view of the embodiment shown in FIG. 4.
Figure 6:
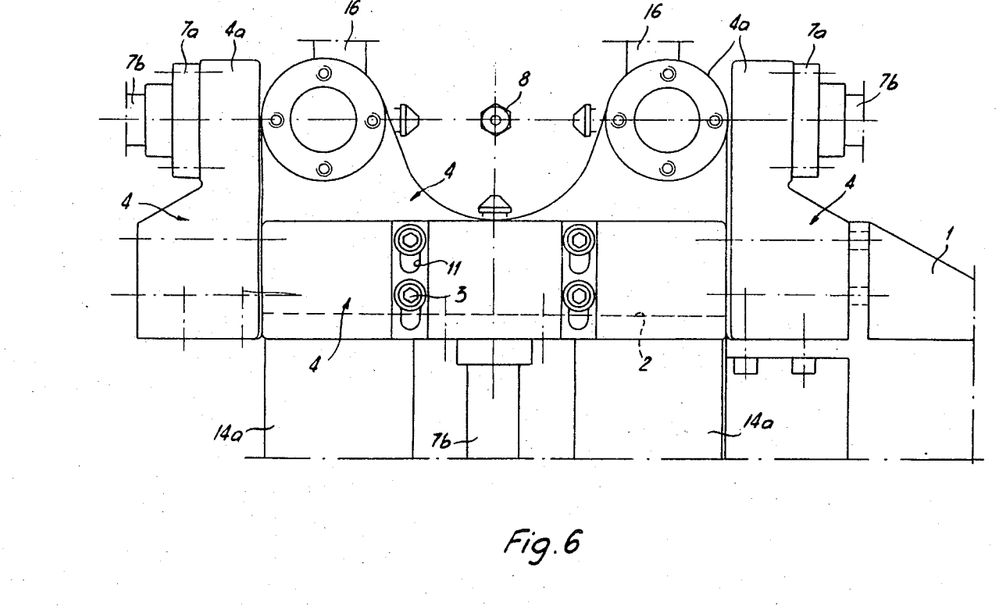
FIG. 6 is a view similar to FIG. 1 of another embodiment of the invention with five mounting units for injection nozzle assemblies.
Figure 7:
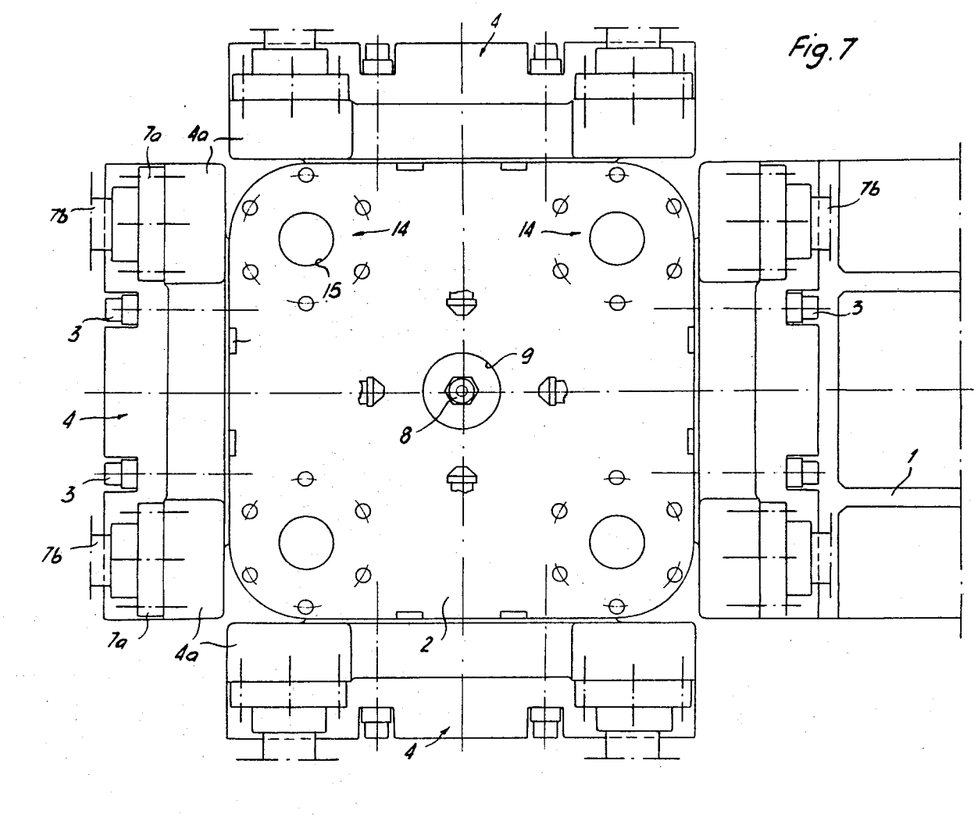
FIG. 7 is a front elevational view of the embodiment shown in FIG. 6.

In the embodiment shown in FIGS. 4 and 5, the parts are substantially identical but an additional mounting part 4 is interposed between the base 1 and the bottom narrow face of the platen 2. This mounting part 4 between the base and the platen 2 provides means for guiding an injection nozzle assembly so that the nozzle may be moved vertically upwardly as indicated by the nozzle 8' in FIG. 4.

FIGS. 6 to 10 show substantially the same construction but with five injection molding units but with the platen 2 being arranged horizontally so that the injection nozzle assembly including the cylinders 14a project downwardly while the rod 16 carrying the movable platen 2' project upwardly. The invention provides an extremely compact construction of injection molding unit and permits the possibility of operation of from one or more injection units which may be mounted on the same single fixed platen. Injection molding machine will have a very high mechanical strength, a great capacity and it may be operated with ease and accuracy.

While a specific embodiment of the invention has been shown and described in detail to illustrate the application of the principles of the invention, it will be understood that the invention may be embodied otherwise without departing from such principles.

What is claimed is:

1. An injection molding machine comprising a mold clamping unit including a fixed platen and a movable platen, said fixed platen being generally rectangular and having a relatively wide and relatively long front and rear faces and relatively narrow injector mounting-part-support end faces, guide rod means on said fixed platen for the guiding of said movable platen, and at least three injection molding nozzle assembly mounting parts mounted respectively on said narrow end faces of said fixed platen and defining guide means projecting over the side of said fixed platen toward said movable platen for supporting an injection nozzle assembly for movement in a plane parallel to the parting plane between said fixed and movable platens, said mounting parts each having transversely spaced flanges which project over the side of said fixed platen, said guide means including a rod carried by each flange for supporting an injection nozzle assembly between said flanges.

2. An injection molding machine comprising a mold clamping unit including a fixed platen and a movable platen, said fixed platen being generally rectangular and having a relatively wide and relatively long front and rear faces and relatively narrow injector mounting-part-support end faces, guide rod means on said fixed platen for the guiding of said movable platen, and at least one injection molding nozzle assembly mounting part mounted on at least one of said end faces and defining guide means projecting over the side of said fixed platen toward said movable platen for supporting an injection nozzle assembly for movement in a plane parallel to the parting plane between said fixed and movable platents, said mounting parts each including transversely extending slots and securement bolt extending through said slots and threaded into said platen, said mounting parts being adjustable forwardly and backwardly to the extent of said slots.

3. An injection molding machine, according to claim 2, including a wedge disposed between said mounting part and said platen for adjustably positioning said platen in respect to said mounting part.

4. An injection molding machine, according to claim 1, wherein said guide rod means for guiding said movable platen includes a support on said fixed platen for a fluid pressure operating cylinder, a guide rod carried in said fluid pressure operating cylinder movable in the bore of said fixed platen and carrying said movable platen.

5. An injection molding machine, according to claim 1, wherein said fixed platen has an opening therethrough, and means for mounting an additional injection molding assembly nozzle mounting part on said fixed platen on the rear side thereof for movement of an injection nozzle toward and away from the opening for the injection through said opening.

6. An injection molding machine, according to claim 1, including an adjusting device, means on said platen for mounting said adjusting device, said adjusting device including a setting gauge, said mounting part being positionable in engagement with said guage for accurate positioning thereof on said platen.

7. An injection molding machine, according to claim 1, wherein said guide rod means on said fixed platen include guide rods which extend through said platen and are connected to said movable platen, said movable platen and said fixed platen forming a frame.

8. An injection molding machine according to claim 1, wherein said fixed platen is substantially vertical and including a frame secured to said platen.

9. An injection molding machine, according to claim 1, wherein said platen extends substantially horizontally on the said guide means including fluid pressure operated guide cylinders connected to said fixed platen and extending downwardly therefrom.

* * * * *